June 7, 1966  O. RUTHNER  3,254,448
INSTALLATION FOR THE ARTIFICIAL CULTIVATION OF
PLANTS, BACTERIA AND OTHER ORGANISMS
Filed March 23, 1964

INVENTOR.
OTHMAR RUTHNER
BY
*Imrie & Smiley*
ATTORNEYS

United States Patent Office 3,254,448
Patented June 7, 1966

3,254,448
INSTALLATION FOR THE ARTIFICIAL CULTIVATION OF PLANTS, BACTERIA AND OTHER ORGANISMS
Othmar Ruthner, 6 Salmgasse, Vienna III, Austria
Filed Mar. 23, 1964, Ser. No. 353,719
2 Claims. (Cl. 47—1.2)

This invention relates to an installation for the artificial cultivation of plants, bacteria and similar organisms on a revolving belt in a cultivation space, in which the living conditions, such as temperature, humidity of the air, irradiation, change of day and night, can suitably be changed in such a manner that the organisms develop under optimum conditions and thus mature much faster than under natural conditions. The belt comprises carrying elements for receiving the organisms and is moved vertically up and down around reversing pulleys to form a closed circulating system. Adjacent to at least one of the reversing points of the belt, the carrying elements are immersed into a container which contains a nutrient solution. An essential object of the invention relates to the provision of a means which prevents a dripping of surplus nutrient solution from higher carrying elements into lower ones after the carrying elements have emerged from the container filled with nutrient solution. For this purpose, the belt forms at least two loops, each of which comprises an ascending belt portion and a descending one. Said revolving belt has a section which extends below the looped portion from the inlet reversing pulley to the outlet reversing pulley thereof. At least a portion of this section is upwardly inclined and a drip pan is provided below this upwardly inclined portion of said revolving belt.

Another object of the invention relates to means for quickly refilling the containers with nutrient solution.

Finally, it is an object of the invention to provide a cultivation space having such a configuration as to enable an efficient utilization of space.

Figure 1:
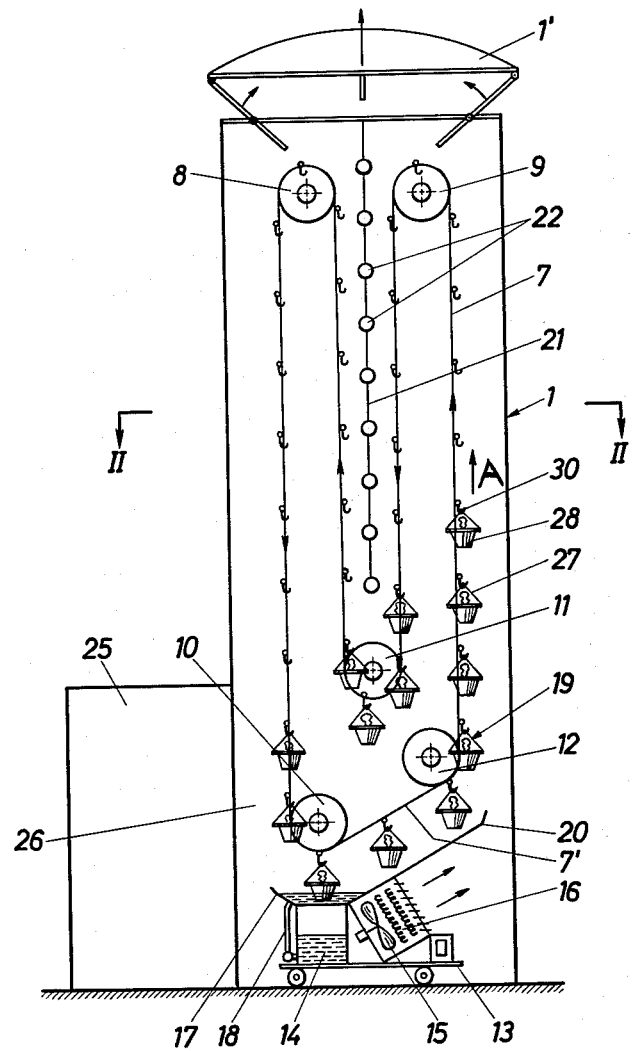
Figure 2:
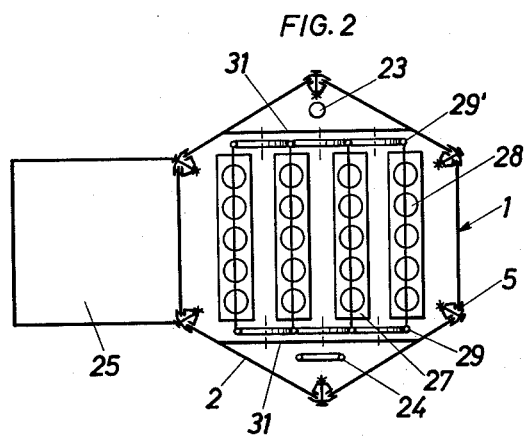
Figure 3:
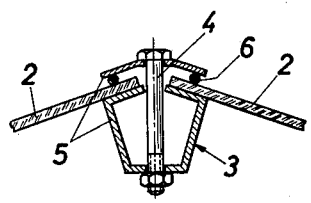

An illustrative embodiment of an installation according to the invention is diagrammatically shown on the drawing. FIG. 1 is an axial longitudinal sectional view showing the installation. FIG. 2 is a sectional view taken on line II—II of FIG. 1 and FIG. 3 is a transverse sectional view showing on an enlarged scale the joint between the side wall of the greenhouse.

The installation according to the invention comprises a towerlike greenhouse 1, which contains an endless revolving belt 7. As is described more fully in the co-pending U.S. patent application Serial No. 333,474, this belt extends around upper reversing rollers 8, 9 and lower reversing rollers 10, 11, and 12 to form two loops. It will be understood that more than two loops may be provided, depending on the cultivation program and the size of the cultivation space. At least one of the reversing rollers is connected to a motor, not shown, which imparts a revolving movement in the direction of the arrow "A" to the endless belt.

The stock to be cultivated, such as plants, is accommodated by carrying elements 19, which comprise a suspension frame 27 and containers 28 placed one beside the other in said frame and containing earth for receiving the plants. As has been described more fully in said co-pending U.S. patent application Serial No. 333,474, the belt comprises two ropes 29, 29', which extend around the reversing pulleys 8–11 and revolve at the same speed and are provided with hook means 30, into which the suspension frames 27 are laterally hooked so as to be freely movable so that they will assume at any point a vertically suspended position, as is apparent from the drawing.

Below the reversing pulleys 10, 11, 12, the belt is guided to form an ascending portion 7'. To supply nutrient to the stock to be cultivated and to control individual or all climatic factors, a wheeled carriage 13 is provided, which carries a tank 14 containing nutrient solution, a fan 15 provided with heaters 16, and other devices, if desired. A container 17 provided at the cover of the tank 14 is supplied with nutrient solution through a feed pipe 18 by pump means, not shown. When the belt 7 moves in the direction of the arrow "A," the container 17 will be in the operating position of the carriage 13 below the reversing pulley on such a level that the carriers 19 suspended from the belt and containing the stock to be cultivated are immersed into the nutrient solution. That side wall of the container 17 which is oriented in the direction of the revolving movement is extended and forms below the inclined portion 7' of the revolving belt 7 a pan 20, which collects liquid dripping from the carriers 19 and conducts it back into the container 17.

As is shown in FIG. 2, the greenhouse is hexagonal in cross-section. The side walls 2 of the greenhouse consist suitably of glass or plastics material and are held at the joints which coincide with the edges by connecting members 3, as is shown in FIG. 3. These members 3 consist of two sectional members 5, which are clamped together by two spaced apart bolts and nuts 4 and between which the walls 2 and interposed sealing strips 6 are inserted. The greenhouse 1 is closed at the top by a roof 1', which can be lifted and lowered to enable a supply of air.

Owing to the polygonal configuration of the greenhouse, corners are formed laterally of the revolving belt and conduits 23 for electric conductors, liquids etc., and a ladder 24 for use in the maintenance and repair of the parts of the various devices can be accommodated in these corners. These corners intended for accommodating the auxiliary means may be confined toward the cultivating space by walls 31.

The greenhouse 1 is adjoined by a preparing house 25, in which the required auxiliary implements may be accommodated and the preparatory work required for the cultivation can be performed.

If the light and sun rays which fall through the walls 2 are not sufficient for the desired cultivation program, columns 21 carrying lighting or irradiating means 22 may be arranged in any desired pattern in the cultivation space. These columns are suitably disposed laterally of the vertical portions of the revolving belts or between these belts. Suitably louvers may cover the transparent walls 2 from time to time for darkening the cultivation space.

The cultivation space is that space of the greenhouse 1 in which the belt 7 revolves whereas the underlying space forms a working space for the gardener. This space may be confined toward the cultivation space, as has been described, in said co-pending U.S. patent application Serial No. 333,474.

The work of the gardener in the greenhouse 1 is performed as follows: The carriers 19 are provided with the stock to be cultivated, such as plants or seeds, and are suspended from the belt 7 at the loading point 26 by hand or by machine. As they travel around the reversing pulley 10, the carriers 19 are immersed into the nutrient solution in the container 17 so that this solution soaks the substrate into which the stock to be cultivated has been inserted. The belt 7 revolves at a low speed so that the relatively short ascending portion 7' is sufficient to enable the pan 20 to collect any liquid which drips from the carrier 19. The stock to be cultivated is then moved very slowly through the conditioned space of the greenhouse and subjected to the artificially created, growth-promoting climatic conditions. The stock to be cultivated may travel around the orbit once or several times. When the cultivation process has been completed, the carriers 19 are removed from the revolving belt at the above-mentioned point 26 and replaced by other carriers laden with new stock to be cultivated.

Within the scope of the invention, the configuration of the greenhouse may be selected to meet the existing conditions. This configuration may have any number of corners or be round. The walls of the greenhouse may be plane or slightly curved.

What is claimed is:

1. A conveyor for the artificial cultivation of plants, bacteria and similar organisms in combination with a mobile cart for feeding nutrient solution to said organisms, said conveyor comprising a movable belt guided around upper and lower reversing pulleys and forming at least one loop including a descending course and an ascending course, said loop having an upwardly inclined portion extending from a first lower reversing pulley toward a second lower reversing pulley at a somewhat higher level, and a plurality of organism receiving and carrying elements hung at spaced intervals along said belt, said mobile cart comprising a platform supported on wheels for rolling movement from a location in which the nutrient may be prepared to a feeding location below the descending course of the belt, an open top receptacle mounted on said platform at a level slightly below the level of said first lower roller, said receptacle being formed with an elongated side wall extending upwardly at an inclination substantially the same as and of approximately the same length as said upwardly inclined portion of the belt loop, whereby said carrying elements moving along said inclined portion after immersion in nutrient in said receptacle may drip excess nutrient on to said elongated wall for drainage return into the receptacle, and a nutrient refilling tank mounted on the wheeled platform and connected by conduit means to said open top receptacle for pumping nutrient solution from the refilling tank to the receptacle.

2. The combination recited in claim 1 wherein said conveyor is installed in a vertical cultivation chamber whose walls closely surround the belt loop, and said mobile cart is further provided with an electrically operated climate modifying device including an air heater and an electric fan mounted to blow heated air along the underside of said elongated and upwardly inclined receptacle wall thence upwardly along one wall for return downwardly along an opposite wall of the chamber whereby the chamber is subjected to a controlled temperature.

References Cited by the Examiner

UNITED STATES PATENTS 2,475,388  7/1949  Hart et al. _____ 74—17 X

FOREIGN PATENTS 163,369  6/1955  Australia.

ANTONIO F. GUIDA, *Primary Examiner.*

R. E. BAGWILL, *Assistant Examiner.*